UNITED STATES PATENT OFFICE

THOMAS STANLEY CURTIS, OF HUNTINGTON PARK, CALIFORNIA, ASSIGNOR TO VITREFRAX CORPORATION, OF HUNTINGTON PARK, CALIFORNIA

RECRYSTALLIZED REFRACTORY COMPOSITION

No Drawing.   Application filed June 26, 1928.   Serial No. 288,533.

This invention relates to the art of refractory compositions and more particularly that class of refractories which are availed of for furnace linings for the carrying out of industrial processes such as glass making. Furnace linings of this character must be capable of great resistance to load at high temperature and also have the property of substantial insolubility in slags, particularly by the silicate slags. This feature is of the utmost importance in refractories used in the industrial process of making glass inasmuch as a batch of molten glass comes in contact with the lining of the furnace.

It is conventional practice in this art to avail of mullite either in fragmentary or granular form as an aggregate in the refractory compositions previously described. This aggregate is usually incorporated into a bonding matrix generally of a feldspathic nature and fashioned into the desired shape. In order to provide a uniform homogeneous structure in the composition it has been the custom to attempt to recrystallize the bonding matrix, this process also being availed of for the purpose of imparting to the ultimate product properties of high resistance at high temperatures and insolubility in silicate slags. This process of recrystallization is usually carried out by firing the composition at a comparatively high temperature, this high temperature being requisite if the crystallized structure is to be rendered homogeneous. This step of firing the tank lining refractory to a sufficiently high temperature to bring about the desired recrystallizing action, is a difficult one and one which is surrounded by many disadvantages. Not only is the operation costly because of the high furnace maintenance expense, but the lining has a tendency to warp or become deformed during the firing and subsequent recrystallizing action.

It is to be remembered that it is of essential importance to fire the lining at a sufficiently high temperature so that it is capable of resisting the action of any glass melts contained therein during the use of the furnace. These glass melts have a tendency to dissolve the lining, particularly the glassy cement usually present in the bonding matrix, which action results in fragments of the mullite grain being precipitated and passing into the product being handled by the furnace causing so-called stones and seed in the ultimate product which renders the latter faulty and often unsalable. It is apparent therefore, that the crystalline body structure as previously described, imparts to the furnace lining properties of long life and durability, but also the feature of being impervious to the action of batches of glass in the process of manufacture therein.

With the foregoing in mind, the primary object of this invention in view is to provide a refractory composition of the type noted in which the bonding matrix for the mullite aggregate is readily recrystallized at a comparatively low temperature and which recrystallizating action is not accompanied with any warping or deforming of the finished product. In carrying out this thought, I avail of mullite in amorphous form as the bonding matrix for the refractory composition. In my copending application Serial No. 296,404 filed July 30, 1928, I have clearly described this form of the substance mullite, but the amorphous mullite herein referred to may be produced in any known manner.

What is meant by the term "amorphous mullite" as herein used, is a true amorphous glass of mullite composition, produced by mixing alumina and silica in powdered form and in proper proportions, and fusing the mixture until thoroughly melted. The melt is then super-cooled so that it solidifies before it has had time to crystallize.

In this state the product is particularly characterized by being solid, hard, dense, and capable of recrystallization with an extraordinary ease and rapidity under a heat treatment of relatively low temperature. Furthermore, as this product provided by the invention set forth in the copending application referred to, is subject to grinding, it is capable of uniting readily with a mullite aggregate. The refractory product comprising a bonding matrix originally of mullite in amorphous form and a mullite aggregate incorporated thereinto, the whole being subsequently recrystallized to provide a homogeneous mass, is susceptible of easy commercial manufacture at a comparatively low expense. Furthermore, this composition has all the requisite properties of great resistance at high temperature, high tensile strength, insolubility in silicate slags, and excellent spalling resistance.

With these and other objects and advantages in view as will in part become apparent and in part be hereinafter stated, the invention comprises certain combinations of elements and compositions as will be set forth as the description proceeds, and of the process specified.

While a preferred specific embodiment of the invention is herein set forth, it is to be understood that I am not to be limited to the exact details described because various modifications may be made in putting the invention into practice within the purview of the appended claims.

In preparing a refractory composition in accordance with this invention, mullite either in granular or fragmentary form is added to a bonding matrix consisting of amorphous mullite ground to a proper mesh. The mixture may then be molded by any conventional process known to the art to provide the desired shape and is subsequently fired in a kiln to a temperature around ceramic cone 17. The resulting refractory product is a composition having all the desired properties set forth in the preceding paragraphs. The particular proportion of the bonding matrix and the aggregate will vary with circumstantial conditions, there being a larger amount of the bonding matrix required when the fragmentary form of the mullite is availed of than otherwise.

Any glassy or vitreous substance which may be evident in the ultimate product, is present only as a filler of the interstices of the pores of the mullite rather than as a bonding agent. Inasmuch as both the bonding matrix and aggregate are mullite, the finished product partakes of the characteristics of mullite in its staple form which is in direct contradiction to the glassy characteristics of the now known types of refractory furnace linings.

Having thus described my invention, what I claim as new and desire to secure by Letters Patent in the United States, is—

1. A refractory composition of the class described, consisting of a mullite aggegate incorporated into a bonding matrix of mullite in amorphous form.

2. The process of preparing a refractory composition which consists in mixing a mullite aggregate in crystalline form to a bonding matrix of mullite in amorphous form, shaping the product to be made therewith, and firing the shaped product to a temperature approximating that of ceramic cone 17.

In testimony whereof I affix my signature.

THOMAS STANLEY CURTIS.